2,749,377
Patented June 5, 1956

2,749,377
3-CHLORO-1-IODO-PROPYNE-1

Howard Johnston, Concord, Calif., assignor to The Dow Chemical Company, Midland, Mich., a corporation of Delaware No Drawing. Application June 7, 1954,
Serial No. 435,079

1 Claim. (Cl. 260—654)

The present invention is directed to 3-chloro-1-iodo-propyne-1 of the following formula, $ClH_2C\text{—}C\equiv CI$. This novel compound is a viscous liquid which is soluble in common organic solvents and of very low solubility in water. The compound is particularly valuable as a fumigant for the control of many common bacteria, fungi and insects and is adapted to be employed as an active toxic constituent of compositions for the control of such organisms.

The new 3-chloro-1-iodo-propyne-1 may be prepared by mixing or otherwise blending an alkali metal hypoiodite such as sodium or potassium hypoiodite with 3-chloro-propyne-1 of the formula $ClH_2C\text{—}C\equiv CH$, whereby iodine is substituted for hydrogen on the unsaturated terminal carbon atom of the propyne compound. The contacting and mixing of the reagents is carried out in water as reaction medium. Good results are obtained when employing substantially equimolecular proportions of the reactants. In general, the employment of a molecular excess of the hypoiodite reagent usually results in optimum yields of the desired product. The reaction is somewhat exothermic and takes place smoothly at temperatures of from 0° to 25° C. The temperature may be controlled by regulating the rate of contacting the reactants and/or by the addition and subtraction of heat as desired. Following the reaction the desired product may be separated in conventional fashion such as washing with water, decantation and fractional distillation under reduced pressure.

In carrying out the reaction, the alkali metal hypoiodite reagent may be prepared in aqueous solution from the reaction of one mole of iodine and one mole of alkali metal hydroxide in aqueous potassium iodide. According to such procedure, the iodine is dissolved in aqueous potassium iodide and the resulting solution mixed with aqueous sodium hydroxide. In a further method, the alkali metal hypoiodite may be prepared in aqueous solution by reacting together sodium or potassium hypochlorite, potassium iodide and water. In such procedure, two or more molecular proportions of potassium iodide are mixed with a solution containing one molecular proportion of alkali metal hypochlorite in one or more molecular proportions of water. The aqueous solution of alkali metal hypochlorite, as above prepared, may be added portionwise under suitable temperature conditions to the 3-chloro-propyne-1 to effect the desired reaction.

In an alternative method of operation, the alkali metal hypoiodite may be formed in situ in the reaction zone. According to this method, the 3-chloro-propyne-1 is dispersed in an aqueous solution of potassium iodide and an aqueous solution of sodium or potassium hypochlorite added portionwise thereto under suitable conditions of temperature in the reaction zone.

In a representative operation, an aqueous solution of sodium hypochlorite was prepared by bubbling 80 grams of chlorine into an aqueous solution containing 100 grams (2.5 moles) of sodium hydroxide in 225 milliliters of water. The latter operation was carried out with cooling and at a temperature of 0° C.

58 grams (0.782 mole) of 3-chloro-propyne-1 was added to 200 grams (1.25 moles) of potassium iodide dissolved in 250 milliliters of water and the above prepared aqueous sodium hypochlorite solution added portionwise thereto with stirring. The addition was carried out at a temperature of from 0° to 5° C. and over a period of 10 minutes. Stirring was thereafter continued for a period of 10 minutes to complete the reaction. Upon discontinuance of stirring, the mixture separated into an aqueous layer and an organic layer. The organic layer was separated, dried and the dried product fractionally distilled under reduced pressure to separate a 3-chloro-1-iodo-propyne-1 product as a viscous liquid boiling at 48°–52° C. at 3.5 millimeters pressure. The latter product had a density of 2.1156 at 25°/25° C., a refractive index $n/D$ of 1.5882 at 25° C. and a chlorine content of 17.7 percent.

The new 3-chloro-1-iodo-propyne-1 is effective as a fumigant and of particular value for the control of soil-dwelling fungi and nematodes. For such use the compound may be distributed on an inert finely divided solid and employed as a dust. In other procedures, the compound may be dispersed in a liquid carrier such as water or a petroleum distillate and the resulting compositions distributed in soil by injection or drilling techniques. Suitable concentrations of the compound in soil are from about 5 to 200 parts by weight per million parts by weight of the soil.

3-chloro-1-iodo-propyne-1 has been employed as a space fumigant for the control of *Rhizopus nigricans*, *Penicillium digitatum* and *Saccharomyceas cerevisiae*. In representative operations, 100 percent controls of these organisms have been obtained at concentrations of 0.01 pound of 3-chloro-1-iodo-propyne-1 per 1000 cubic feet of space.

I claim:

3-chloro-1-iodo-propyne-1.

References Cited in the file of this patent

Chemical Abstracts, vol. 33, page 4191 (1939), abstracting an article by A. I. Zakharova in J. Gen. Chem. (U. S. S. R.), vol. 8, page 1224 (1938).